Feb. 27, 1973   B. J. COSTELLO   3,718,800
INFRARED HEATING APPARATUS
Original Filed March 5, 1968   2 Sheets-Sheet 1
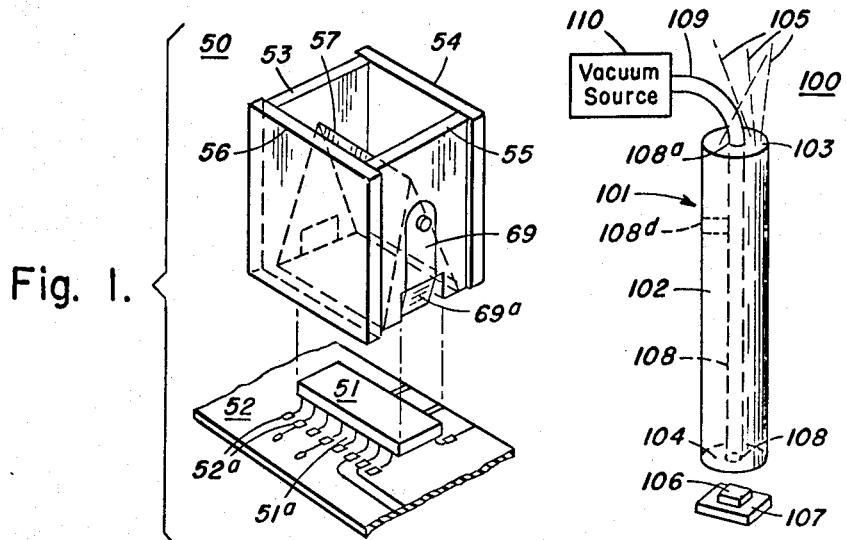
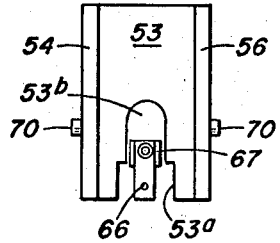
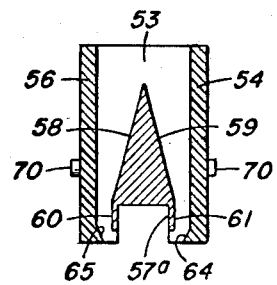
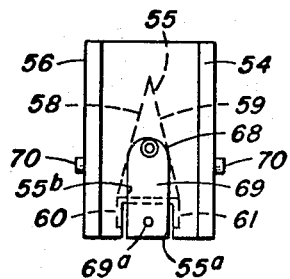
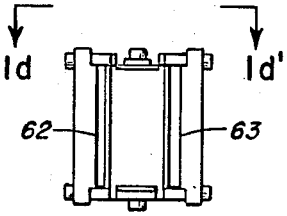
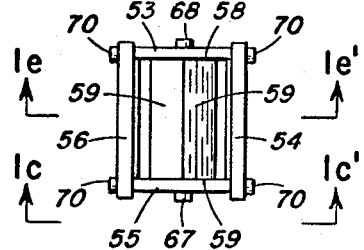
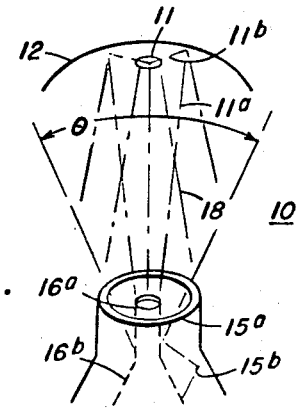
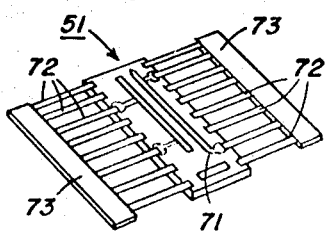
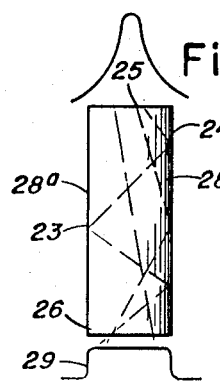
INVENTOR
BERNARD J. COSTELLO
BY
Ostrolenk, Faber, Gerb & Soffen
ATTORNEYS Feb. 27, 1973   B. J. COSTELLO   3,718,800
INFRARED HEATING APPARATUS
Original Filed March 5, 1968   2 Sheets-Sheet 2
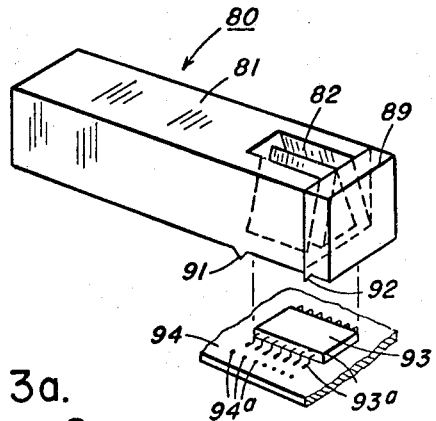
Fig. 3.
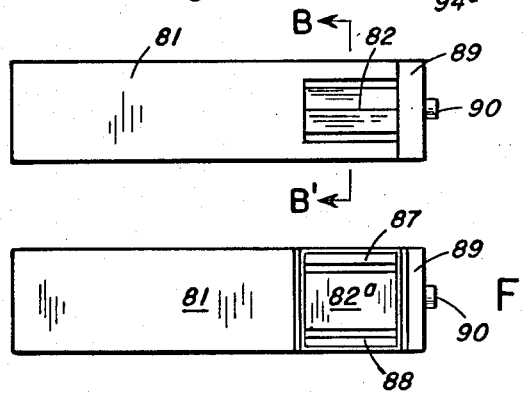
Fig. 3a.

Fig. 3b.
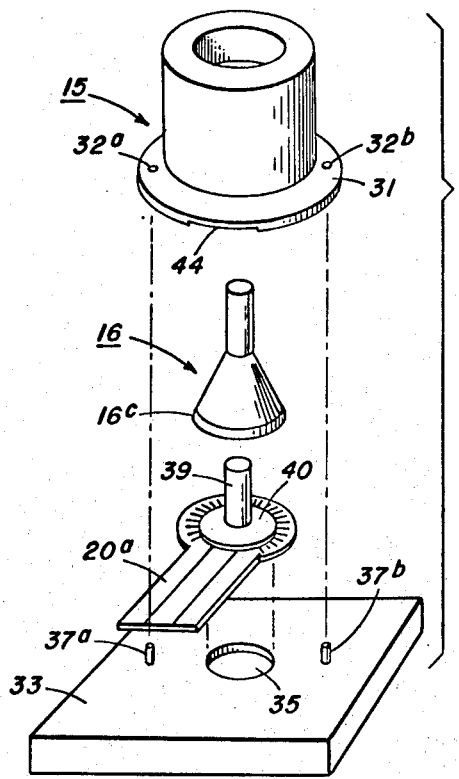
Fig. 4.

INVENTOR.
BERNARD J. COSTELLO
BY
Ostrolenk, Faber, Gerb & Soffen
ATTORNEYS

3,718,800
INFRARED HEATING APPARATUS
Bernard J. Costello, Ringoes, N.J., assignor to Argus Engineering Company, Inc., Hopewell, N.J.
Original application Mar. 5, 1968, Ser. No. 710,546, now Patent No. 3,522,407, dated Aug. 4, 1970. Divided and this application Mar. 20, 1970, Ser. No. 24,963
Int. Cl. B23k 1/04; G02b 5/14
U.S. Cl. 219—85                                                       1 Claim

ABSTRACT OF THE DISCLOSURE

Apparatus employed in conjunction with a radiation source for heating or soldering electronic components wherein the apparatus is provided with one or more chambers having highly reflective surfaces aligned relative to one another so as to direct radiation entering into the chamber downwardly through the chamber so as to be emitted through the bottom opening of the chamber and thereby greatly improve the uniformity of distribution of the radiation to irradiate a region of a workpiece being soldered such that the configuration of the irradiated region is exclusively determined by the configuration of the exit opening provided in the reflective chamber. The structure comprising the chamber may also be employed to hold and accurately position the electronic component as well as masking the component from radiation and hence undue heating.

---

This application is a division of application Ser. No. 710,546, filed Mar. 5, 1968, now U.S. Pat. No. 3,522,-407, issued Aug. 4, 1970.

The present invention relates to soldering apparatus employing infrared radiation, and more particularly to a soldering apparatus including a highly reflective chamber for guiding the infrared rays toward the workpiece and distributing the rays upon an irradiated surface whose configuration is exclusively determined by the configuration of the outlet end of the reflective chamber through which the infrared rays are emitted.

The miniature and subminiature electronic components presently finding widespread use throughout the electronics industry necessitate the employment of exotic techniques in order to solder such components to one another. In miniature electronic circuits such as integrated circuits, flat packs, and the like, the electrical terminals or leads of such circuits are so small and fragile so as to complicate the soldering of these components to one another or to printed circuit boards provided therefor.

Such conventional soldering techniques are comprised of the steps of holding the heated tip of a soldering iron into engagement with a terminal and simultaneously applying solder thereto. Since such miniature and subminiature circuits may have as many as seventy five terminals, and since as many as fifty or one hundred of these circuits may be mounted upon a single printed circuit board, conventional soldering techniques become rather tedious and time-consuming. The above disadvantages have led to the development of soldering apparatus employing infrared radiation. Such apparatus is normally comprised of a source of infrared radiation such as, for example, a quartz lamp and an elliptical reflector which reflects the infrared rays impinging upon the reflective surface, toward a rather confined region in which the components to be joined are positioned. Whereas such apparatus has achieved success, it has been found that the pattern of the infrared rays is not sufficiently defined in some instances and in these cases the infrared rays are potentially capable of overheating areas or zones outside the area intended to be heated. One such apparatus is described in copending application Ser. No. 561,112 filed June 28, 1966, issued as U.S. Pat. No. 3,469,061 on Sept. 25, 1969. In this apparatus, the infrared rays are directed to the area of the workpiece in which a miniature integrated circuit is to be soldered. To protect the miniature circuit from being damaged, a wedge-shaped metallic member is positioned above the miniature circuit to mask it from radiation and to expose only the terminals of the miniature circuit to the radiation. The radiation strikes the reflective surfaces of the wedge-shaped member and is reflected downwardly and away from the wedge-shaped surface. It has been found that the infrared rays diverge to some extent so that the region immediately adjacent to the wedge is substantially starved of radiant energy. This situation is not of concern except in cases where the integrated circuit leads are very short or where the package body itself produces a shadow in the region to be heated.

The present invention is characterized by providing an apparatus for distributing the infrared rays within a very specific area wherein the intensity and hence heat distribution over the area is substantially uniform.

The present invention is comprised of a metallic member having a hollow chamber with at least two opposing reflective surfaces which are preferably nearly parallel to one another so as to capture infrared rays entering the chamber and cause these rays to be reflected a number of times from surface-to-surface before passing through the outlet end of the chamber at which point they strike the surface of the workpiece being soldered. The multiple reflections experienced by the infrared rays cause the rays to mix and randomly distribute over the entire region defined by the outlet of the chamber so as to irradiate the surface of the workpiece beneath the chamber outlet in a uniform manner and permit the soldering operation to be performed rapidly over an area that would be otherwise impossible to define. The orientation of the chamber reflective surfaces relative to the source of infrared radiation is such as to assure that a large portion of the infrared rays entering the chamber inlet will pass through the chamber outlet so as to be available for irradiating a selected region of the workpiece. The chamber cross-section perpendicular to the direction of transmission may be formed of any configuration, depending upon the configuration of the workpieces being soldered so as to irradiate a substantially square-shaped area, rectangular-shaped area, curve-shaped area, annular or toroidal-shaped area, and so forth. The masking of the miniature circuit from being soldered is preserved so as to prevent the miniature circuit from being irradiated during the soldering process and to efficiently direct the radiation to the terminals of the miniature circuit, thereby assuring that adequate heat is provided to perform the soldering operation within a very brief time interval.

Referring now to the drawings.

FIG. 1 is a perspective view, partially in exploded form, showing one preferred embodiment of the present invention and the manner in which it is employed for the purpose of soldering miniature circuits to a printed circuit board.

FIGS. 1a and 1b are top and bottom views of the embodiment of FIG. 1 which shows one preferred embodiment of the invention in perspective.

FIGS. 1c and 1d are views showing the first and second ends of the embodiment of FIG. 1.

FIG. 1c is a sectional view of the embodiment of FIG. 1 taken along the line A–A' of FIG. 1a.

FIG. 2 shows an alternative form of a miniature circuit which may be soldered to other components through the use of the embodiment of FIG. 1.

FIG. 3 is a perspective view of an alternative embodiment of the present invention.

FIGS. 3a and 3b are top and bottom views, respectively, of the embodiment of FIG. 3.

FIG. 3c is a sectional view of the embodiment of FIG. 3 taken along the line B-B' of FIG. 3a.

FIG. 4 is a perspective view showing, in exploded form, still another alternative embodiment of the present invention.

FIG. 5 is a simplified diagram showing the manner in which the embodiment of FIGS. 4 and 4a is employed in an infrared radiation apparatus.

FIG. 5a is a diagram showing the manner in which the uniformity of infrared rays is significantly enhanced through the use of the present invention.

FIG. 6 is a perspective view showing still another preferred embodiment of the present invention.

Figure 3C:
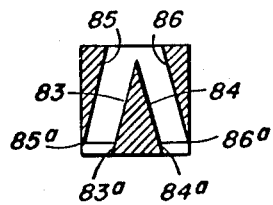

Referring now to the drawings, FIG. 5 shows an infrared soldering apparatus comprised of a source of infrared radiation 11, which may, for example, be a filament, an arc-discharge device or a plasma device. However, in the embodiment of FIG. 1 the energy source is a 1000 watt filament lamp. A detailed description of the infrared radiation structure of FIG. 5 (with the exception of the contribution of the present invention) is shown and described in detail in copending U.S. application Ser. No. 561,112 filed June 28, 1966, now U.S. Pat. No. 3,469,061.

As can be seen from FIG. 5, the infrared rays are emitted substantially in an omnidirectional fashion, some rays being directed substantially vertically downward. All those rays directed either slightly upwardly or in the upward vertical and near vertical direction are caused to strike upon the highly reflective surface of an ellipsoidal reflector member 12 which causes the rays such as, for example, ray 11b to strike the surface of reflector 12 and be directed vertically downward after reflection, forming the ray portion 11b'. Whereas, idealistically speaking, the infrared radiation source may, for a simplified explanation, be considered to be a point light source, in actuality the source is of finite size. It has been shown substantially as an oval-shaped radiation source. Thus, some of the rays directed vertically upward are reflected by reflector 12 back toward the radiation source which blocks the downwardly directed rays. The ellipsoidal shaped reflector member 12 is employed in such a manner as to focus the radiation in the focal region 13 which is not a single point but is a region of finite size which has a shape preferably in conformity with the inlet opening of the chamber 14 which collects and distributes in a substantially uniform manner, the inwardly directed infrared rays upon a workpiece in a manner to be more fully described. The infrared ray distributing structure, in the embodiment of FIG. 5, is comprised of a substantially cylindrical shaped housing 15 having an opening 15a which is of substantially the same dimensions as the focal plane upon which the rays deflected by reflector 12 are directed. The upper portion of housing interior 15a is a substantially straight wall 15b of cylindrical configuration which is highly polished so as to provide a highly reflective surface. The upper portion of interior surface 15b tapers downwardly and outwardly forming surface portion 15c which is likewise a highly polished and highly reflective surface.

A substantially conical-shaped member 16 having a longitudinal axis which is colinear with the longitudinal axis of member 15 has an upper portion 16a which is substantially cylindrical in configuration. The lower portion thereof tapers downwardly and outwardly to form a conical-shaped surface portion 16b. Both surface portions 16a and 16b are highly polished and highly reflective. Although the top portion 16d of substantially conical-shaped member 16 will reflect infrared rays away from the opening 13, the intensity of radiation impinging upon surface 16c is insignificant as the majority of infrared rays which pass through the focal region 13 are deflected (i.e. directed) by the ellipsoidal shaped reflector 12.

As can clearly be seen, the open interior region, whose outer limits are defined by the inner walls 15b and 15c, and whose inner limits are defined by the surfaces 16a and 16b provide a substantially circular-shaped region at both the inlet and outlet ends. The outlet end of the structure 14 as shown in FIG. 4 may be employed, for example, to irradiate the leads on a flexible printed circuit member 20 that are arrayed in a circular pattern so that these leads may be soldered to associated termination areas (not shown).

The irradiation occurs in the following manner:

Infrared rays impinge upon the highly reflective surfaces 15b, 15c, 16a and 16b and undergo multiple internal reflections repetitively from one opposing surface to the other, as shown by the dotted lines 18, for example, before the infrared rays are ultimately passed through the outlet end of the chamber.

The effectiveness of the interior chamber having opposing reflective walls can best be appreciated from a consideration of FIG. 5a which, while it shows an interior chamber having spaced parallel walls, is nevertheless satisfactory for explaining the function of the chamber. As shown in FIG. 5, the chamber is defined by highly reflective walls 23 and 24 and has an inlet end 25 and an outlet end 26. A distributional curve 27 represents the distribution of infrared rays (and hence the intensity of infrared rays) across inlet opening 25. The rays do not enter into the chamber in a direction parallel to walls 23 and 24 since the walls of the chamber, or at least a portion thereof, are preferably offset at an angle relative to the vertical, as shown by the lower portion of the interior chamber of apparatus 14 (i.e. walls 15c and 16b). As a result of this offset orientation, the rays are reflected or bounced repetitively between the opposing reflective surfaces 23 and 24, as shown by dotted lines 28 and 28a until the rays are ultimately emitted from the outlet end 26. Some rays such as ray 28c may, however, enter and pass through the chamber without reflection. The distributional pattern (and hence the intensity) of the emitted rays passing through outlet opening 26 are represented by the distributional curve 29. From a consideration of the distributional curves 27 and 29, it can be clearly seen that the highly reflective chamber mixes the distribution so that the intensity of rays passing out of the outlet end 26 are distributed across the opening in a very uniform manner so that the entire region of each contact 21 (see FIG. 5a) will be heated in a uniform manner.

The assembly which forms the chamber having highly reflective opposing walls further serves to limit the irradiated area to only that configuration which is desired to be heated. For example, in the embodiment of FIGS 5 and 5a, the terminals 21 which are to be soldered to associated wires 22 are arranged in a substantial circular pattern. The infrared radiation is confined to the arcuate region occupied by the contacts. A still further advantage of the structure is that the conical shaped member 16 which is positioned above the central region 20a of flexible printed circuit member 20, completely conceals or masks this region so that it is not subjected to any infrared radiation and therefore not subjected to any undue heating which might otherwise damage or destroy the printed circuitry lying therebeneath. Thus, the reflective chamber assembly serves the dual advantageous functions of exposing the contacts to be soldered to uniform radiation to assure uniform heating thereof as well as concealing sensitive portions of the circuitry to prevent them from being irradiated and thereby damaged or destroyed as a result of the heat generated by the irradiation.

The shape of the chamber formed by the apparatus 14 of FIG. 5 is determined in the following manner:

The maximum angle $\theta$ at which infrared rays will be directed toward the inlet end of the chamber should impinge upon the portion 16a of conical-shaped member 16 so that upon their reflection the rays will not be directed out of the inlet end but conversely, will be reflected off surface 16a and on to surface 15c. Thus, the point at which surface 16a tapers downwardly and outwardly should be at least below the point at which the lines defining the angle θ strike the portion 16a of member 16. Any infrared rays entering into the inlet end of the chamber at a smaller angle than θ will be caused to strike surface 16b and be reflected upon surface 15c so that these rays will be directed downwardly and pass through the outlet end instead of being reversed and lost through the inlet end. The diagonal alignment of the lower portion of the chamber thereby increases the effectiveness of the reflection cavity to further assure the uniform distribution of radiation as shown by curve 29 of FIG. 5b. While the existence of an optimum angle θ has been established and this angle presupposes that the reflective cavity is composed of essentially parallel walls, either the minimum θ and the parallel wall supposition may be violated if necessary with a sacrifice in the efficiency of transmission.

Figure 4A:
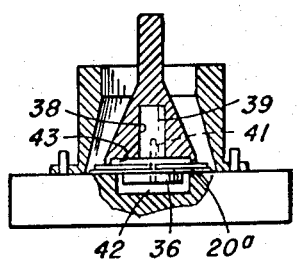
FIG. 4a is a sectional view of the embodiment of FIG. 4 when fully assembled.

FIGS. 4 and 4a show the structure 14 of FIGS. 5 and 5a in greater detail. As shown in these figures, the cylindrical housing 15 is provided with a circular flange 31 having openings 32a and 32b for the purpose of assuring proper alignment of housing 15 upon a base or support member 33. The surface of support 33 is provided with a circular-shaped cavity 35 to receive a member 36, to be more fully described. A pair of projecting pins 37a and 37b are positioned, preferably along a diameter of circular cavity 35 to be received by openings 32a and 32b in flange 31 so as to facilitate alignment of housing 15 upon working surface 33.

Conical-shaped member 16 has a thin cylindrical shaped portion 16c at its extreme bottom end to substantially cover the entire central portion of the assembly that is to be protected. This "skirt" also serves as an aid in allowing the radiation to have access to the extreme inner portion of the terminal area.

Member 16 is further provided with a cylindrical-shaped opening 38 which can best be seen in FIG. 4. Opening 38 receives a cylindrical-shaped member 39 whose lower end is provided with a disc-shaped base portion 40. A threaded opening 41 is provided through member 39 and base portion 40 for receiving a threaded fastener 42 to secure a circular-shaped disc 36 thereto. The manner in which members 36, 39 and 42 are assembled is as follows:

The flexible printed circuit member 20 is provided with a suitable opening (not shown) designed to receive threaded fastener 42. Flexible printed circuit 20 is positioned so that its terminals 21 face in the direction of base portion 40. Disc 36 is positioned on the underside of the flexible printed circuit member so that its central opening is aligned with the openings provided in member 39 and in the flexible printed circuit. The threaded fastening member 42 is then passed through the openings in disc 36 and flexible printed circuit 20 so as to threadedly engage the threaded opening provided in member 39. This rigidly secures the flexible printed circuit to the assembly comprised of elements 36, 39, 40 and 42.

Once the flexible printed circuit is affixed to the above-mentioned elements, the cylindrical portion 39 is inserted into opening 38 (which forms a very slight force-fitting therebetween). The underside of member 16 is provided with a substantially circular-shaped depression 43 so that the peripheral base portion 16c of member 16 makes surface contact with the upper surface of flexible printed circuit member 20. This assembly is then positioned upon supporting surface 33 so that disc 26 is received in cavity 35. The depth of cavity 35 is sufficient to provide clearance for disc 36 and the head of fastening member 42 in order that the undersurface of the flexible printed circuit member 20 makes contact with the surface of support 33.

This step having been completed, the hollow cylindrical member 15 is then positioned so that its openings 32a and 32b receive projecting pins 37a and 37b provided in supporting surface 33. The underside of flange 31 is provided with a cutaway portion 44 having a depth and width sufficient to accommodate the straight portion 20a of flexible printed circuit 20 so as to properly align the flexible printed circuit 20 upon the supporting surface 33. FIG. 4 shows an exploded view of the assembly just described, while FIG. 4a shows a cross-sectional view of all of the elements in the fully assembled position. From a consideration of FIGS. 4 and 4a, it can be seen that the surfaces 16a, 16b, 15b and 15c form a hollow chamber defined by the reflective surfaces for the purpose of controlling and defining the radiation which impinges upon the contact terminals 21 of printed circuit member 20 and which further assure that the infrared rays are uniformly distributed over the entire region of the terminals to be soldered to assure the provision of good solder joints.

The leads 21 to be soldered to associated terminals (not shown) may be positioned beneath the flange 31 of hollow cylindrical member 15 which, in turn, acts to rigidly position and align the leads while heating. Also, since the operation consists of a reflow operation, the terminals may be covered, coated, or otherwise applied with a solder paste of the type described in my copending applications and more specifically as shown in FIG. 1, for example, of application Ser. No. 561,112, now U.S. Pat. No. 3,469,061.

The configuration of the reflective surfaces assure the fact that a substantial portion of the radiation focussed in a region substantially defined by the inner diameter of upper surface portion 15b will not be reflected out of the reflection chamber but will be retained therein, will undergo a number of reflections and will ultimately pass through the outlet end of the chamber formed by members 15 and 16 so as to irradiate and hence heat the exposed surface lying immediately beneath the outlet end of the chamber in a very uniform manner. The concentration of the infrared rays is such as to enable the soldering or tinning operation to be performed rather rapidly. Since member 16 completely "masks" the central portion of flexible printed circuit member 20, this portion is not exposed to any radiation and will thus be prevented from experiencing any harmful heating.

FIG. 1 shows a perspective view and FIGS. 1a–1c show additional detailed views of still another embodiment of the present invention. The embodiment 50 shown therein may be employed for the purpose of soldering integrated circuits commonly referred to as flat packs (designated by the numeral 51 shown in FIG. 1) to a printed circuit board 52. Conversely, the assembly 50 may be employed for the purpose of removing flat packs from such printed circuit assemblies, if desired. An alternative miniature circuit which may be soldered to printed circuit boards is shown in FIG. 2 and will be more fully described.

Referring now to FIGS. 1 and 1a–1c, the assembly 50 is comprised of a housing having four sides 53–56 which cooperate to form a substantially rectangular shaped housing. The interior surfaces of each of the sides 53–56 (which sides are formed of a suitable metallic material) are highly polished and hence highly reflective. A substantially prism shaped member 57 has its two parallel sides 58 and 59 (see FIG. 1a) in surface contact with and rigidly secured to housing sides 53 and 55, respectively. The apex of the solid pyramid shaped member (which is also formed of a suitable metallic material) is positioned near the top opening of the housing and the sloping or diagonal side walls of prism shaped member 57 taper downwardly and outwardly until they reach a point at which they join the vertically aligned side walls 60 and 61 located in close proximity to the underside of the housing. The tapering surfaces 58 and 59 of prism shaped member 57 are highly polished and highly reflective as are the vertically aligned sides 60 and 61. From a consideration of either FIGS. 1c or 1e, it can be seen that the interior chamber defined by the reflective surfaces comprising the interior surfaces of sides 53–56 and surfaces 58–61 can be seen to be substantially wide at the inlet portion of the assembly, which interior chamber narrows to form two narrow elongated outlet openings 62 and 63, shown best in FIG. 1b which is a plan view of the underside of the assembly.

The lowermost interior surfaces of sides 54 and 56 are tapered inwardly to form sloping sidewall portions 64 and 65 which further narrow the outlet openings 62 and 63, respectively, and also "kick" the infrared radiation toward the central axis of the housing assembly forming the reflective chamber.

The side 53 of the exterior housing is provided with a rectangular shaped cutout portion 53a, shown best in FIG. 1d. A depression 53b is located immediately above the cutout portion and serves as the mounting surface of a ragid metallic member 66 cooperating with a metallic resilient member 69, shown in FIG. 1c, in a manner to be more fully described. Side 55 is provided with a similar rectangular shaped cutout portion 55a and a similar shaped depression 55b which serves as the mounting surface for the upper end of the metallic resilient spring member 69. The lower portion 69a of spring member lying below the upper edge of the cutout portion 55a is bent inwardly, as can best be seen in FIG. 1. Members 66 and 69 are secured to side walls 53 and 55, respectively, by fastening members 67 and 68, respectively. Side walls 54 and 56 are likewise secured to their adjacent side walls 53 and 55 by fastening members 70, shown best in FIGS. 1a–1c.

The prism shaped member 57 is provided with a cavity 57a in its base portion which is designed to receive the flat pack integrated circuit in a manner to be more fully described.

The method of use and operation of the reflective chamber 50 is as follows:

Let it be assumed that it is desired to mount the flat pack 51, shown in FIG. 1, upon a printed circuit board 52 by soldering its leads 51a to associated terminals 52a provided on the upper surface of printed circuit board 52. As can clearly be seen, flat pack 51 is provided with leads which protrude downwardly from the underside of the flat pack and are bent outwardly so that their distal ends lie substantially in a plane parallel to the underside of the flat pack.

The flat pack is placed into the cavity 57a by positioning the right-hand end of the flat pack against the lower portion 69a of the metallic spring member. The flat pack is then pressed upwardly into the cavity so that its left and right-hand ends (relative to FIG. 1) are embraced respectively, between the rigid metallic member 66 and the spring member 69. The reflective chamber assembly may then be positioned above printed circuit board 52. The flat pack leads 51a are aligned with the associated terminals 52a on the printed circuit board. A suitable infrared radiation source 11 which may, for example, be a filament, an arc discharge device or a plasma device, as described in copending application Ser. No. 561,112, now U.S. Pat. No. 3,469,061, is positioned directly above the inlet end of reflective chamber 50. A suitable reflector assembly having an ellipsoidal cross-sectional configuration is positioned above the source of infrared radiation and the dimensions of the ellipsoid are such as to focus the radiation to a focal plane of substantially rectangular configuration which is substantially concident with the inlet opening of the reflective chamber. As was the case with regard to the assembly of FIGS. 4, 4a and 5, the infrared rays enter into the reflective chamber and undergo a number of reflections before passing through the outlet end of reflective chamber assembly 50. The angle of inclination of the reflective surfaces 58 and 59 of prism-shaped member 57 is such as to insure that all infrared rays entering into the inlet end of the chamber will be reflected downwardly to pass through the outlet end. The density of the infrared radiation is substantially constant across the two elongated slots 62 and 63 to insure uniform heating of the associated flat pack leads 51a and printed circuit terminals 52a. Since the main body of the flat pack 51 is positioned well within cavity 57a, no infrared radiation impinges upon the flat pack to prevent the flat pack from experiencing any undue heating which may cause deterioration or permanent damage to its operating characteristics. As is set forth in detail in copending application Ser. No. 561,112, now U.S. Pat. No. 3,469,061, a suitable solder paste may either be deposited upon the printed circuit terminals 52a or the flat pack leads 51a, or both, to provide sufficient solder for forming a satisfactory solder joint. As can clearly be seen, the elongated outlet openings or slots 62 and 63 further prevent exposure of the remaining surface of printed circuit board 52 to the infrared radiation. The uniform density and concentration of the infrared radiation at the outlet openings of the reflective chamber enable the soldering operation to be performed rather quickly. Such soldering operations may be performed in less than five seconds and have been found to yield excellent solder joints. The length of the reflective chamber is dependent only upon the needs of the particular user and in the case of the arrangement of FIG. 1, can be seen to provide more than 16 separate solder connections in the performance of a single infrared heating operation.

The reflective chamber assembly 50 of FIG. 1 may further be employed to solder the leads of a miniature rectangular shaped solid state circuit 51', as shown in FIG. 2. The main body portion 71 has provided thereon an integrated circuit which may, for example, be a multistage amplifier, an oscillator or any one of a number of other solid state circuits. The leads 72 are provided for connecting terminals of the solid state circuit to peripheral circuitry and are normally secured to a pair of metallic rectangular shaped sheets 73 to prevent the leads from being damaged during handling of the circuit prior to mounting the circuit. Obviously these sheets 73 may be cut away immediately prior to the soldering operation. The rectangular shaped circuit may then be positioned within cavity 57a in the same manner as was previously described so as to be rigidly embraced between rigid member 66 and spring member 69. The circuit may then be positioned with its leads 72 aligned with the associated terminals of a printed circuit board which may, for example, be similar to that shown in FIG. 1. The leads 72 or the printed circuit board terminals, or both, may be coated with a suitable solder paste sufficient for forming a good solder joint between associated leads and terminals. In the embodiment of FIG. 2, it can be seen that all leads may simultaneously be soldered to associated printed circuit board terminals during a single infrared heating operation.

The reflective chamber assembly 50 of FIG. 1 may also be employed to advantage in applications wherein it is desired to remove either a circuit of the flat pack type 51 or of the type 51 or 51' from a printed circuit board. In such instances the chamber is positioned above the circuit to be removed so that its members 66 and 69 embrace the extreme ends of the circuit. The radiation source is then energized and the rays are focussed upon the inlet end of the chamber by an ellipsoidal reflective member (see FIG. 5) for a period sufficient to place the solder in a fluid state enabling removal of the circuit.

Still another embodiment of the present invention is shown in FIGS. 3–3c. The embodiment 80 of these figures is comprised of an elongated, solid, metallic member 81 whose right-hand end may be joined to any suitable chamber positioning means (not shown) employed to align the chamber above a solid state circuit during the soldering operation.

The reflective chamber is formed by machining or otherwise shaping the right-hand end of member 81 to provide a triangular prism-shaped member 82 having sloping side walls 83 and 84 which are highly polished and hence highly reflective. The hollow reflective chamber is further defined by opposing side walls 85 and 86 which are also diagonally aligned, highly polished and hence highly reflective surfaces. The inlet portion of the chamber is a substantially rectangular-shaped opening which divides into chamber portions, forming a pair of outlet openings or elongated slots 87 and 88, which can best be seen in FIG. 3b. The chamber is further defined by an end piece 89 secured to elongated member 81 by a suitable fastening member 90.

The lowermost edges 85a and 86a of side walls 85 and 86 terminate at a level slightly higher than the lowermost edges 83a and 84 of side walls 83 and 84, respectively, causing the infrared radiation entering the reflective chamber to be "kicked outwardly" at the outlet portions of the assembly. The small projections 91 and 92 provided along the underside of member 81 bear upon the surface of the miniature circuit 93 to be soldered to a printed circuit board 94 and further facilitate alignment of the chamber with the body portion of the miniature solid state circuit. The circuit 93 is aligned so that its leads 93a make surface contact with associated terminals 94a provided on the upper surface of printed circuit board 94. The underside 82a of prism-shaped member 82 is preferably of a size sufficient to conceal the entire body portion of the solid state circuit 93 to prevent infrared radiation from striking the body portion and thereby prevent undue heating thereof. In the same manner as was previously described, a suitable radiation source and ellipsoidal reflector member may be provided during the soldering operation. Again, it should be obvious that the miniature circuit body leads or the printed circuit board terminals, or both, are dipped or coated with a solder or solder paste, to provide a sufficient amount of the material to form a good solder joint.

The general resemblance between the embodiments of FIGS. 1 and 3 can be seen to lead to the obvious conclusion that the infrared rays entering the reflective chambers are bounced between opposing walls 83–85 and 84–86 a number of times before exiting through the outlet openings. In a like manner, the distribution of radiation at the outlet openings assures uniform application of heat to the leads and terminals being soldered and permits the soldering operation to be performed within a very brief interval of time.

FIG. 6 shows still another preferred embodiment of the present invention which may be employed to heat elements in a manner similar to that previously described. The embodiment 100 of FIG. 6 is comprised of a light transmissible rod 101 which may, for example, have a circular cross-sectional configuration. The curved surface of rod 101 is highly polished. The rod may, for example, be a quartz rod having excellent light transmissive properties. In the same manner as was previously described, infrared rays indicated by dotted lines 105 are focussed upon the upper surface 103 of rod 101 by means of a suitable light source and reflector elements 11 and 12, respectively, as shown in FIG. 5. The radiation entering the upper end 103 of rod 101, due to the highly polished outer surface 102 of the rod, is caused to experience a number of reflections over the length of the rod causing the radiation emitted through the bottom end 104 of rod 101 to be distributed in a very uniform manner over the region immediately beneath the bottom end 104. The radiation is further substantially confined to strike a region of substantially the same configuration as bottom end 104 so as to prevent any undue heating of regions surrounding the element to be heated.

One application of the quartz rod technique is that of bonding an element such as, for example, a silicon chip 106, to a substrate or other surface 107. The bottom end 104 of rod 101 is positioned immediately above element 106 and provides sufficient heat which is uniformly distributed over a region defined by the configuration of bottom end 104 to enable the element 106 to be bonded to the substrate 107 in a very brief interval of time.

Since the elements 106 may be chips of quite small dimension in thickness the quartz rod 101 of FIG. 6 may be further provided with a narrow conduit or passageway 108 running substantially along the longitudinal axis of rod 101 and having openings 108a and 108b at the top and bottom ends 103 and 104 respectively of rod 101. A vacuum source 110 is coupled to opening 108a by means of a conduit 109. In operation, the vacuum source 110 draws a vacuum in passageway 108 to hold the chip 106 or other element against the bottom surface 104 of the rod merely by virtue of placing the element over the bottom opening 108b. The heat carried by the quartz rod also typically referred to as a light pipe is directed to the chip 106 and the immediately surrounding area. The highly polished and hence reflective outer surface 102 of the quartz rod operates in substantially the same fashion as the hollow chambers previously described for the purpose of causing rays passing through the rod to be reflected or bounced by the surface in passing downwardly toward the element to be heated. In a like manner, the embodiments of FIGS. 1–5 described hereinabove may be simplified to provide reflective surfaces around the interior of the housing and the opposing reflective surfaces provided on the members 16 of FIG. 4, 57 of FIG. 1 and 82 of FIG. 3, for example, may be eliminated so that the reflections will take place against the interior surfaces of the outer housing.

In order to prevent conduit 109 from obstructing rays directed toward top surface 103, it is also possible to provide a lateral passageway 108c communicating with the vertically aligned passageway 108b, which passageway 108c may be located intermediate the ends 103 and 104 of the quartz rod. The conduit 109 may then be coupled to the opening 108d along the vertical surface of rod 101 without obstructing radiation directed toward top surface 103. Also, if desired, more than one passageway may be provided in the rod in order to hold more than one element against the bottom surface of rod 101. This may simply be done by branching the bottom portion of the opening 108 into a plurality of openings provided in bottom end 104 which may serve to hold a single element against bottom surface 104 or may, alternatively, serve to hold a plurality of elements against the bottom surface.

It can be seen from the foregoing that the present invention provides a novel assembly consisting of a highly reflective chamber for the uniform application of high intensity radiation to metallic elements to be joined together in a soldering process or otherwise heated wherein all of the radiation is concentrated only upon the immediate region or regions occupied by the elements being soldered and that all remaining areas of the elements whose leads or terminals are being soldered are sufficiently masked so as to experience no or very little heating. The shape of the reflective chamber may be varied in any fashion in order to accommodate the configuration or contour of the array of terminals being soldered. The reflective chamber is dimensioned so that a maximum percentage of the radiation focussed upon the inlet opening of the chamber is caused to pass through the outlet opening or openings and are distributed in a very uniform fashion over the entire area of the outlet opening or openings.

Although there has been described a preferred embodiment of this novel invention, many variations and modifications will now be apparent to those skilled in the art, Therefore, this invention is to be limited, not by the specific disclosure herein, but only by the appending claim.

I claim:

1. Apparatus for use in infrared heating of elements of relatively small size, wherein a plurality of spaced discrete areas of an element are simultaneously uniformly heated, comprising:

an elongated reflective conduit having polished side walls;

a source of infrared energy and means for focusing rays from said source at a predetermined location;

a first end of said conduit being positioned to receive radiation focussed at said predetermined location by said focusing means;

a second end of said conduit having a perimeter sufficient to encompass said plurality of conductive areas and being positioned above the element to be heated;

the walls of said conduit being highly polished to cause rays entering the first end to be reflected a number of times by said walls so as to exit to the second end of said conduit and impinge upon the element to be heated;

said polished reflective walls being adapted to cause the radiation exiting through the outlet opening to be distributed in a uniform fashion across the region defined by the configuration of said second end to thereby heat said element in a uniform fashion and in a precisely defined area limited to the perimeter of said second end;

said conduit being an elongated solid rod of radiation transmissible material having a highly polished exterior surface over the region intermediate said first and second ends;

said rod being provided with a narrow passageway substantially aligned with the axis of said rod and having an opening in said rod second end; and vacuum means coupled to said passageway through a lateral passageway located at a point spaced from said second end and intermediate said first and second ends of said rod for holding the element to be heated against the second end of said rod while minimizing the obstruction of radiation directed through said rod.

References Cited

UNITED STATES PATENTS

| | | | |
|---|---|---|---|
| 1,880,414 | 10/1932 | Capstaf | 350—96 R X |
| 2,604,005 | 7/1952 | Hahn | 350—96 R X |
| 2,942,099 | 6/1960 | Goldstein | 350—96 R X |
| 3,283,124 | 11/1966 | Kawecki | 219—85 X |
| 3,304,403 | 2/1967 | Harper | 350—96 R X |
| 2,922,873 | 1/1960 | Bibbero et al. | 350—96 R X |

DAVID H. RUBIN, Primary Examiner

U.S. Cl. X.R.

350—96 R